United States Patent
Jin et al.

(10) Patent No.: US 11,641,405 B2
(45) Date of Patent: May 2, 2023

(54) GPU BOX SERVER CASCADE COMMUNICATION METHOD, DEVICE, AND SYSTEM

(71) Applicant: ZHENGZHOU YUNHAI INFORMATION TECHNOLOGY CO., LTD., Henan (CN)

(72) Inventors: Xianqi Jin, Henan (CN); Yingliang Qiao, Henan (CN); Huatang Ban, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 382 days.

(21) Appl. No.: 16/962,859

(22) PCT Filed: Aug. 31, 2018

(86) PCT No.: PCT/CN2018/103436
§ 371 (c)(1),
(2) Date: Jul. 17, 2020

(87) PCT Pub. No.: WO2019/140921
PCT Pub. Date: Jul. 25, 2019

(65) Prior Publication Data
US 2020/0351355 A1    Nov. 5, 2020

(30) Foreign Application Priority Data

Jan. 17, 2018    (CN) .......................... 201810044572.8

(51) Int. Cl.
*H04L 67/141*    (2022.01)
*G06T 1/20*    (2006.01)
(Continued)

(52) U.S. Cl.
CPC .............. *H04L 67/141* (2013.01); *G06T 1/20* (2013.01); *H04L 12/40006* (2013.01);
(Continued)

(58) Field of Classification Search
CPC ..... G06T 1/20; H04L 12/40006; H04L 41/04; H04L 41/12; H04L 41/16; H04L 67/141; H04L 69/16; H04L 2012/40208
See application file for complete search history.

(56) References Cited

U.S. PATENT DOCUMENTS

| 10,325,343 B1* | 6/2019 | Zhao .................... G06F 11/3006 |
| 2009/0232025 A1* | 9/2009 | Baggott .................. H04L 41/12 370/254 |

(Continued)

FOREIGN PATENT DOCUMENTS

| CN | 102571452 A | 7/2012 |
| CN | 104869098 A | 8/2015 |

(Continued)

OTHER PUBLICATIONS

International Search Report for PCT/CN2018/103436 dated Nov. 12, 2018, ISA/CN.

(Continued)

*Primary Examiner* — Thomas J Dailey
(74) *Attorney, Agent, or Firm* — Yue (Robert) Xu; Apex Attorneys at Law, LLP

(57) ABSTRACT

A GPU Box server cascade communication method, device, and system. The method includes: detecting an i2c communication bus through a baseboard management controller (BMC) in a powered-up GPU Box server to determine whether a next-stage GPU Box server corresponding to the GPU Box server exists, and if yes, reading an IP address and location information of the next-stage GPU Box server from the i2c communication bus by means of the BMC in the
(Continued)

GPU Box server; and storing the IP address and the location information of the next-stage GPU Box server into a data structure of the GPU Box server so that a master control server reads the data structure of the GPU Box server, and establishing network communication with the next-stage GPU Box server according to the IP address and the location information stored in the data structure.

5 Claims, 1 Drawing Sheet

(51) Int. Cl.
  *H04L 12/40* (2006.01)
  *H04L 41/04* (2022.01)
  *H04L 69/16* (2022.01)
  *H04L 41/12* (2022.01)
  *H04L 41/16* (2022.01)
(52) U.S. Cl.
  CPC .............. *H04L 41/04* (2013.01); *H04L 41/12* (2013.01); *H04L 69/16* (2013.01); *H04L 41/16* (2013.01); *H04L 2012/40208* (2013.01)

(56) References Cited

U.S. PATENT DOCUMENTS

| | | | |
|---|---|---|---|
| 2010/0080228 | A1 | 4/2010 | Kwapniewski et al. |
| 2011/0153798 | A1* | 6/2011 | Groenendaal ........... H04L 63/20 |
| | | | 713/153 |
| 2014/0132612 | A1* | 5/2014 | Schulze ................. G09G 5/363 |
| | | | 345/505 |
| 2017/0153998 | A1* | 6/2017 | Fong ................... G06F 13/4282 |

FOREIGN PATENT DOCUMENTS

| | | |
|---|---|---|
| CN | 107239346 A | 10/2017 |
| CN | 108173735 A | 6/2018 |

OTHER PUBLICATIONS

CNIPA First Office Action corresponding to Application No. 201810044572.8; dated Jun. 25, 2019.

* cited by examiner

GPU BOX SERVER CASCADE COMMUNICATION METHOD, DEVICE, AND SYSTEM

This application is the national phase of International Application No. PCT/CN2018/103436, titled "GPU BOX SERVER CASCADE COMMUNICATION METHOD, DEVICE, AND SYSTEM", filed on Aug. 31, 2018, which claims the priority to Chinese Patent Application No. 201810044572.8, titled "GPU BOX SERVER CASCADE COMMUNICATION METHOD, DEVICE, AND SYSTEM", filed on Jan. 17, 2018 with the China National Intellectual Property Administration (CNIPA), which is incorporated herein by reference in its entirety.

TECHNICAL FIELD

Embodiments of the present disclosure relate to the technical field of management on servers, and in particular, to a communication method, apparatus and system for cascaded GPU Box servers.

BACKGROUND

With the development of artificial intelligence, deep learning has become widely applied in the field of artificial intelligence, and the demand for GPU (Graphics Processing Unit, that is a graphics processor) box servers in the application market is increasing. Therefore, the development of GPU box servers becomes a hot project at present. A large number of GPU modules are integrated on a GPU Box server for processing and calculating large amounts of data, and the GPU Box server has superior performance. Multiple GPU Box servers may be cascaded together, to further improve capability of data processing and computing of an entire GPU Box cabinet. Thus, how to manage the communication of different GPU Box servers on the entire GPU Box cabinet has become an extremely important requirement on management.

Therefore, how to provide a communication method, apparatus and system for cascaded GPU Box servers that solve the above technical problems has become an urgent problem to be solved for those skilled in the art.

SUMMARY

Embodiments of the present disclosure aim to provide a communication method, apparatus and system for cascaded GPU Box servers, which can realize the communication management of a corresponding GPU Box server by a master control server, ensuring running performance of the GPU Box server, and improving the capability of the GPU Box server in data processing and computing.

To solve the above technical problems, an embodiment of the present disclosure provides a communication method for cascaded GPU Box servers, including:

in step S11, detecting an i2c communication bus through a baseboard management controller BMC in a GPU Box server being powered on, to determine whether there is a next-stage GPU Box server corresponding to the GPU Box server; and proceeding to step S12 in response to a positive determination;

in step S12, reading an IP address and location information of the next-stage GPU Box server from the i2c communication bus through the BMC in the GPU Box server; and in step S13, storing the IP address and the location information of the next-stage GPU Box server into a data structure of the GPU Box server, such that a master control server reads the data structure of the GPU Box server and establishes network communication between the master control server and the next-stage GPU Box server based on the IP address and the location information stored in the data structure of the GPU Box server.

In an embodiment, the method further includes:

reading an IP address of the GPU Box server from the i2c communication bus through the master control server, and establishing network communication between the master control server and the GPU Box server based on the IP address of the GPU Box server.

In an embodiment, after reading an IP address and location information of the next-stage GPU Box server from the i2c communication bus through the BMC in the GPU Box server, the method further includes:

reading a data structure of the next-stage GPU Box server from the i2c communication bus through the BMC in the GPU Box server; where the data structure of the next-stage GPU Box server is stored with an IP address and location information of a later-stage GPU BOX server corresponding to the next-stage GPU Box server; and adding the IP address and the location information of the later-stage GPU Box server corresponding to the next-stage GPU Box server stored in the data structure of the next-stage GPU Box server to the data structure of the GPU Box server, such that the master control server establishes network communication between the master control server and each GPU Box server based on each IP address and corresponding location information stored in the data structure of the GPU Box server.

In an embodiment, after reading an IP address and location information of the next-stage GPU Box server from the i2c communication bus through the BMC in the GPU Box server, the method further includes:

establishing network communication between the GPU Box server and the next-stage GPU Box server based on the IP address of the next-stage GPU Box server.

In an embodiment, after reading a data structure of the next-stage GPU Box server from the i2c communication bus through the BMC in the GPU Box server, the method further includes:

establishing network communication between the GPU Box server and the later-stage GPU Box server based on the IP address of the later-stage GPU Box server corresponding to the next-stage GPU Box server stored in the data structure of the next-stage GPU Box server.

An embodiment of the present disclosure provides a communication apparatus for cascaded GPU Box servers, including:

a detection module, configured to: detect an i2c communication bus through a baseboard management controller BMC in a GPU Box server being powered on, to determine whether there is a next-stage GPU Box server corresponding to the GPU Box server; and trigger a reading module in response to a positive determination;

the reading module, configured to: read an IP address and location information of the next-stage GPU Box server from the i2c communication bus through the BMC in the GPU Box server; and a storage module, configured to: store the IP address and the location information of the next-stage GPU Box server into a data structure of the GPU Box server, such that a master control server reads the data structure of the GPU Box server and establishes network communication between the master control server and the next-stage GPU Box server based on the IP address and the location information stored in the data structure of the GPU Box server.

In an embodiment, the apparatus further includes:

an establishment module, configured to: read an IP address of the GPU Box server from the i2c communication bus through the master control server, and establish network communication between the master control server and the GPU Box server based on the IP address of the GPU Box server.

An embodiment of the present disclosure provides a communication system for cascaded GPU Box servers, including the communication apparatus for cascaded GPU Box servers described above.

A communication method, apparatus and system for cascaded GPU Box servers are provided in the embodiments of the present disclosure. With the method, the i2c communication bus is detected through the baseboard management controller BMC in the GPU Box server being powered on, to determine whether there is a next-stage GPU Box server corresponding to the GPU Box server. The IP address and the location information of the next-stage GPU Box server are read from the i2c communication bus through the BMC in the GPU Box server, in response to a positive determination. The IP address and the location information of the next-stage GPU Box server are stored in the data structure of the GPU Box server, such that the master control server reads the data structure of the GPU Box server, and establishes network communication between the master control server and the next-stage GPU Box server based on the IP address and the location information stored in the data structure of the GPU Box server.

In embodiments of the present disclosure, after the GPU Box server is powered on, the BMC located inside the GPU Box server detects, from the i2c communication bus, whether there is a next-stage GPU Box server corresponding to the GPU Box server. When it is detected that there is a next-stage GPU Box server, an IP address and location information of the next-stage GPU Box server can be read out from the i2c communication bus, and the IP address and the location information of the next-stage GPU Box server are stored in its own data structure of the GPU Box server. The master control server may obtain the IP address and the location information of the next-stage GPU Box server by reading the data structure of the GPU Box server. The master control server establishes network communication with the next-stage GPU Box server based on the IP address and the corresponding location information. Thus, communication management on the corresponding GPU Box server by the master control server is realized, the running performance of the GPU Box server is ensured, and the capability of the GPU Box server in data processing and computing is greatly improved.

BRIEF DESCRIPTION OF THE DRAWINGS

In order to more clearly illustrate technical solutions in embodiments of the present disclosure, drawings used in the description of the embodiments or the conventional technology are introduced briefly hereinafter. Apparently, the drawings described in the following simply illustrate some embodiments of the present disclosure, and other drawings may be obtained by those ordinary skilled in the art based on these drawings without any creative efforts.

DETAILED DESCRIPTION OF EMBODIMENTS

A communication method, apparatus and system for cascaded GPU Box servers are provided in embodiments of the present disclosure, to realize communication management on the corresponding GPU Box server by the master control server, ensure the running performance of the GPU Box server, and greatly improve capability of the GPU Box server in data processing and computing.

To make the objectives, technical solutions, and advantages of the embodiments of the present disclosure clearer, the technical solutions in the embodiments of the present disclosure will be described clearly and completely hereinafter in conjunction with the drawings in the embodiments of the present disclosure. Apparently, the described embodiments are only a part of the embodiments of the present disclosure, rather than all embodiments. Based on the embodiments in the present disclosure, any other embodiments made by the skilled in the art without any creative efforts fall within the protection scope of the present disclosure.

Figure 1:
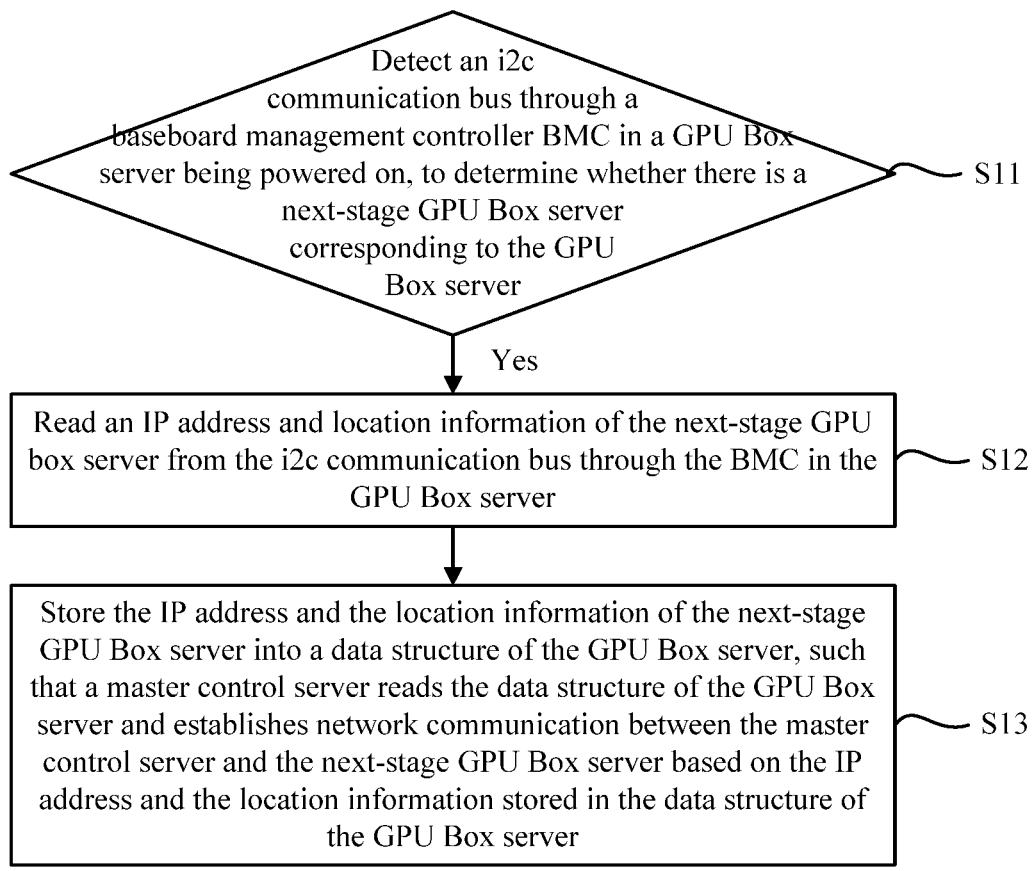
FIG. 1 is a flow chart of a communication method for cascaded GPU Box servers according to an embodiment of the present disclosure.

Reference is made to FIG. 1, which is a flow chart of a communication method for cascaded GPU Box servers according to an embodiment of the present disclosure. The method includes the following steps S11 to S13.

In step S11, an i2c communication bus is detected through a Baseboard Management Controller BMC in a GPU Box server being powered on, to determine whether there is a next-stage GPU Box server corresponding to the GPU Box server; and proceed to step S12 in response to a positive determination.

In step S12, an IP address and location information of the next-stage GPU Box server are read from the i2c communication bus through the BMC in the GPU Box server.

In step S13, the IP address and the location information of the next-stage GPU Box server are stored into a data structure of the GPU Box server, such that a master control server reads the data structure of the GPU Box server and establishes network communication between the master control server and the next-stage GPU Box server based on the IP address and the location information stored in the data structure of the GPU Box server.

It should be noted that, when multiple GPU Box servers are deployed in an entire cabinet, each GPU Box server may be physically connected through the i2c communication bus in advance, and the master control server may also be physically connected to each GPU Box server through the i2c communication bus. Each GPU Box server has a BMC. In the present disclosure, when a GPU Box server is powered on, the BMC located in the GPU Box server will detect the i2c communication bus. Since the i2c communication bus records detailed information of each GPU Box server connected to the i2c communication bus, it can be determined through the i2c communication bus that whether a current GPU Box server has a next-stage GPU Box server connected to it, that is, whether there is a next-stage GPU Box server connected to the current GPU Box server at a next stage. If there is a next-stage GPU Box server connecting to the current GPU Box server, the BMC in the current GPU Box server may read the IP address and the location information of the next-stage GPU Box server through the i2c communication bus, and store the IP address and the location information of the next-stage GPU Box server into the data structure of the current GPU Box server. The master control server may obtain the IP address and the location information of the GPU Box server (that is, the next-stage GPU Box server) located at a next stage of the current GPU Box server by reading the data structure in the current GPU Box server. The master control server may establish network communication with the next-stage GPU Box server based on the IP address, and determine a position of the next-stage GPU Box server in a cascaded topology including multiple GPU Box servers based on the location information. Thus, the communication management on the corresponding GPU Box server by the master control server is realized.

Specifically, the BMC in each GPU Box server being powered on in the entire cabinet will detect the i2c communication bus, to detect whether there is a next-stage GPU Box server of the GPU Box server corresponding to the BMC. For example, if there are three GPU Box servers connected to the i2c communication bus, respectively as a first GPU Box server, a second GPU Box server and a third GPU Box server in an order from the top to the bottom. After the three GPU Box servers are powered on, a BMC located inside the first GPU Box server will detect through the i2c communication bus whether there is a GPU Box server located at a next stage of the first GPU Box server, a BMC located inside the second GPU Box server will also detect through the i2c communication bus whether there is a GPU Box server located at a next stage of the second GPU Box server, and a BMC located inside the third GPU Box server will also detect through the i2c communication bus whether there is a GPU Box server located at a next stage of the third GPU Box server. The BMC inside the first GPU Box server may detect through the i2c communication bus that, there is a next-stage GPU Box server, and the next-stage GPU Box server is the second GPU Box server. At this time, an IP address and location information of the second GPU Box server are obtained and stored into a data structure of the first GPU Box server. The BMC inside the second GPU Box server may detect through the i2c communication bus that, there is a next-stage GPU Box server, that is, the third GPU Box server, and at this time an IP address and location information of the third GPU Box server are obtained and stored into a data structure of the second GPU Box server. The BMC inside the third GPU Box server may detect through the i2c communication bus that, there is no GPU Box server at a next stage of the third GPU Box server, which means that the third GPU Box server is a GPU Box server located at the last stage.

Specifically, when there are three GPU Box servers connected to the i2c communication bus, a process of establishing network communication between the master control server and a corresponding GPU Box server is as follows.

The master control server may directly control the communication of the first GPU Box server through the i2c communication bus. The master control server may read a data structure of the first GPU Box server through the i2c communication bus, establish network communication between the master control server and the second GPU Box server based on an IP address of the second GPU Box server recorded in the data structure, and determine a hierarchical relationship between the second GPU Box server and the first GPU Box server based on corresponding location information. When the master control server needs to establish network communication with the third GPU Box server, the master control server may read data structure of the second GPU Box server through the i2c communication bus and the first GPU Box server, thus to read an IP address and location information of the third GPU Box server and further to establish the network communication with the third GPU Box server, and determine a hierarchical relationship between the second GPU Box server and the third GPU Box server.

Further, the method also includes the following step.

An IP address of the GPU Box server is read from the i2c communication bus through the master control server, and network communication between the master control server and the GPU Box server is established based on the IP address of the GPU Box server.

It should be noted that, in order to further improve control management on each GPU Box server in the entire cabinet, the master control server in the embodiment of the present disclosure not only can establish network communication with the next-stage GPU Box server, but also can establish network communication with the current GPU Box server based on the IP address of the current GPU Box server. For example, the master control server in the embodiment of the present disclosure may establish network communication with the first GPU Box server based on the IP address of the first GPU Box server, thus to further improve capability of data processing and computing.

Further, after the IP address and the location information of the next-stage GPU Box server are read from the i2c communication bus through the BMC in the GPU Box server, the method further includes the following steps.

A data structure of the next-stage GPU Box server is read from the i2c communication bus through the BMC in the GPU Box server; where the data structure of the next-stage GPU Box server is stored with an IP address and location information of a later-stage GPU Box server corresponding to the next-stage GPU Box server; and The IP address and the location information of the later-stage GPU Box server corresponding to the next-stage GPU Box server stored in the data structure of the next-stage GPU Box server are added to the data structure of the GPU Box server, such that the master control server establishes network communication between the master control server and each GPU Box server based on each IP address and corresponding location information stored in the data structure of the GPU Box server.

It should be noted that, after each GPU Box server obtains the IP address and the location information of the next-stage GPU Box server connected next to it, the IP address and the location information of the next-stage GPU Box server will be stored in the data structure of the GPU Box server. Thus, if the next-stage GPU Box server detects that there is a later-stage GPU Box server corresponding to the next-stage GPU Box server, an IP address and location information of the later-stage GPU Box server will be stored in a data structure of the next-stage GPU Box server. For a current GPU Box server, after reading the IP address and the location information of the next-stage GPU Box server, may further read the data structure of the next-stage GPU Box server, thus to obtain the IP address and the location information of the later-stage GPU Box server. The obtained IP address and the location information of the later-stage GPU Box server may be added to the data structure of the current GPU Box server. Thus, it can be seen that, the data structure of the current GPU Box server not only stores the IP address and the location information of the next-stage GPU Box server, but also stores the IP address and the location information of the later-stage GPU Box server corresponding to the next-stage GPU Box server. Through a continuous process of detecting and obtaining, the current GPU Box server may obtain each IP address and corresponding location information of each GPU Box server at each stage located below the current GPU Box server. The master control server may obtain each IP address and location information of each GPU Box server at each stage below the current GPU Box server by merely reading the data structure of the current GPU Box server, so as to obtain the positional relationship between all the GPU Box servers quickly, and establish the network communication between the master control server and each GPU Box server quickly.

In embodiments of the present disclosure, a stable communication mode can be formed between the master control server and each GPU Box server in the entire cabinet, to further improve the communication efficiency and capability of a system in data processing and computing. Thus, a large number of GPU Box server nodes can be deployed in the entire cabinet, to achieve clustering of GPU Box servers and improve the performance of the server significantly.

Further, after the IP address and the location information of the next-stage GPU Box server are read from the i2c communication bus through the BMC in the GPU Box server, the method further includes the following steps.

Network communication between the GPU Box server and the next-stage GPU Box server is established based on the IP address of the next-stage GPU Box server.

It should be noted that, in this embodiment of the present disclosure, network communication between the current GPU Box server and the next-stage GPU Box server thereof can also be established, thereby enabling rapid communication between the current GPU Box server and the next-stage GPU Box server thereof, and improving the communication efficiency and overall computing performance.

Further, after the data structure of the next-stage GPU Box server is read from the i2c communication bus through the BMC in the GPU Box server, the method further includes the following step.

Network communication between the GPU Box server and the later-stage GPU Box server is established based on an IP address of the later-stage GPU Box server corresponding to the next-stage GPU Box server stored in the data structure of the next-stage GPU Box server.

It should be noted that, in this embodiment of the present disclosure, it may not only establish network communication between the current GPU Box server and the next-stage GPU Box server, but also establish network communication between the current GPU Box server and the later-stage GPU Box server which is located below the next-stage GPU Box server of the current GPU Box server.

Specifically, after reading the data structure of the next-stage GPU Box server, the current GPU Box server may establish network communication between the current GPU Box server and the later-stage GPU Box server corresponding to the next-stage GPU Box server based on the IP address of the later-stage GPU Box server recorded in the data structure of the next-stage GPU Box server. That is, a GPU Box server preceding to the current GPU Box server may obtain an IP address of a GPU Box server subsequent to the current GPU Box server by reading the data structure in the current GPU Box server, to establish network communication between the GPU Box server preceding to the current GPU Box server and the GPU Box server subsequent to the current GPU Box server based on the IP address. The two GPU Box servers can communicate directly through the network. The GPU Box server preceding to the current GPU Box server does not need to communicate with the GPU Box server subsequent to the current GPU Box server via the current GPU Box server, thereby improving the communication efficiency and capability of the system in data processing and computing significantly.

It can be understood that, with the above method, communication between any two GPU Box servers can be established. Thus any two GPU Box servers may be communicated directly, without an intermediate GPU Box server, thereby greatly enhancing the communication capabilities of the system.

In embodiments of the present disclosure, after the GPU Box server is powered on, the BMC located inside the GPU Box server detects through the i2c communication bus whether there is a next-stage GPU Box server which is located next to the current GPU Box server. When it is detected that there is a next-stage GPU Box server, an IP address and location information of the next-stage GPU Box server are read out through the i2c communication bus, and the IP address and the location information of the next-stage GPU Box server will be stored in the data structure of the current GPU Box server. The master control server may obtain the IP address and the location information of the next-stage GPU Box server by reading the data structure of the current GPU Box server. The master control server may establish network communication with the next-stage GPU Box server based on the IP address and the corresponding location information. Thus, the communication management of the corresponding GPU Box server by the master control server is realized, the running performance of the GPU Box server is ensured, and the capability of the GPU Box server in data processing and computing is greatly improved.

Based on the foregoing embodiments, a communication apparatus for cascaded GPU Box servers is further provided in an embodiment of the present disclosure.

Figure 2:
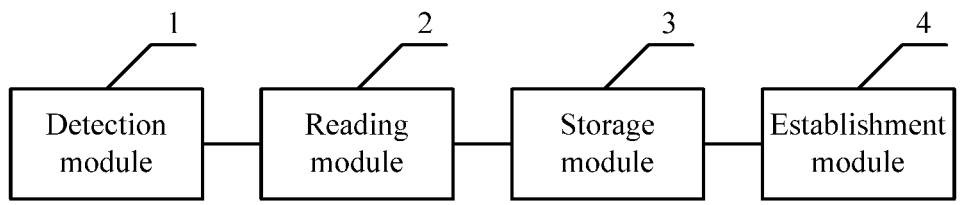
FIG. 2 is a structural schematic diagram of a communication apparatus for cascaded GPU Box servers according to an embodiment of the present disclosure.

Referring to FIG. 2, the apparatus includes: a detection module 1, a reading module 2 and a storage module 3.

The detection module 1 is configured to: detect an i2c communication bus through a baseboard management controller BMC in a GPU Box server that is powered on, to determine whether there is a next-stage GPU Box server corresponding to the GPU Box server, and trigger the reading module 2 in response to a positive determination.

The reading module 2 is configured to: read an IP address and location information of the next-stage GPU Box server from the i2c communication bus through the BMC in the GPU Box server.

The storage module 3 is configured to: store the IP address and the location information of the next-stage GPU Box server into a data structure of the GPU Box server, such that a master control server reads the data structure of the GPU Box server and establishes network communication between the master control server and the next-stage GPU Box server based on the IP address and the location information stored in the data structure of the GPU Box server.

In an embodiment, the apparatus further includes an establishment module 4. The establishment module 4 is configured to: read an IP address of the GPU Box server from the i2c communication bus through the master control server, and establish network communication between the master control server and the GPU Box server based on the IP address of the GPU Box server.

It should be noted that, in embodiments of the present disclosure, communication between all GPU Box servers in the entire cabinet can be realized, and rapid and effective control management on each GPU Box server can be achieved. Thus, the running performance of the GPU Box server is ensured, and the capability of the GPU Box server in data processing and computing is greatly improved.

In addition, the specific illustration to the communication apparatus for cascaded GPU Box servers involved in this embodiment of the present disclosure may be referred to the above method embodiments, which will not be described again herein.

Based on the foregoing embodiments, a communication system for cascaded GPU Box servers is further provided in an embodiment of the present disclosure, and the system includes the communication apparatus for cascaded GPU Box servers described above.

It should be noted that, this embodiment of the present disclosure has the same beneficial effects as the above method embodiments. And the specific illustration of the communication system for cascaded GPU Box servers involved in this embodiment of the present disclosure may be referred to the above method embodiments, which will not be described again herein.

The above embodiments in the specification are described in a progressive manner. Each of the embodiments is mainly focused on describing its differences from other embodiments, and references may be made among these embodiments with respect to the same or similar portions among these embodiments. Descriptions of the apparatus disclosed in the embodiments are simple since the apparatus corresponds to the method disclosed in the embodiments, and related explanations can be found in descriptions of the method.

It should be further noted that, the term "include", "comprise" or any variant thereof is intended to encompass non-exclusive inclusion so that a process, method, article or device including a series of elements includes not only those elements but also other elements which have not been listed definitely or an element(s) inherent to the process, method, article or device. Moreover, the expression "comprising a(n) . . . " in which an element is defined will not preclude presence of an additional identical element(s) in a process, method, article or device including the defined element(s) unless further defined.

Based on the above description of the disclosed embodiments, those skilled in the art are capable of carrying out or using the present disclosure. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the broadest scope consistent with the principle and novel features disclosed herein.

The invention claimed is:

1. A communication method for cascaded graphics processing unit (GPU) Box servers, comprising:
   in step S11, detecting an inter-integrated circuit (i2c) communication bus through a baseboard management controller (BMC) in a GPU Box server being powered on, to determine whether there is a next-stage GPU Box server corresponding to the GPU Box server; and proceeding to step S12 in response to a positive determination;
   in step S12, reading an IP address and location information of the next-stage GPU Box server from the i2c communication bus through the BMC in the GPU Box server;
   in step S13, storing the IP address and the location information of the next-stage GPU Box server into a data structure of the GPU Box server, such that a master control server reads the data structure of the GPU Box server and establishes network communication between the master control server and the next-stage GPU Box server based on the IP address and the location information stored in the data structure of the GPU Box server;
   reading an IP address of the GPU Box server from the i2c communication bus through the master control server, and establishing network communication between the master control server and the GPU Box server based on the IP address of the GPU Box server;
   reading a data structure of the next-stage GPU Box server from the i2c communication bus through the BMC in the GPU Box server, wherein the data structure of the next-stage GPU Box server is stored with an IP address and location information of a later-stage GPU Box server corresponding to the next-stage GPU Box server; and
   adding the IP address and the location information of the later-stage GPU Box server corresponding to the next-stage GPU Box server stored in the data structure of the next-stage GPU Box server to the data structure of the GPU Box server, such that the master control server establishes network communication between the master control server and each GPU Box server based on each IP address and corresponding location information stored in the data structure of the GPU Box server.

2. The communication method for cascaded GPU Box servers according to claim 1, wherein after reading the IP address and the location information of the next-stage GPU Box server from the i2c communication bus through the BMC in the GPU Box server, the method further comprises:
   establishing network communication between the GPU Box server and the next-stage GPU Box server based on the IP address of the next-stage GPU Box server.

3. The communication method for cascaded GPU Box servers according to claim 1, wherein after reading the data structure of the next-stage GPU Box server from the i2c communication bus through the BMC in the GPU Box server, the method further comprises:
   establishing network communication between the GPU Box server and the later-stage GPU Box server based on the IP address of the later-stage GPU Box server corresponding to the next-stage GPU Box server stored in the data structure of the next-stage GPU Box server.

4. A communication apparatus for cascaded graphics processing unit (GPU) Box servers, comprising: a processor and a memory storing computer instructions,
   wherein the processor, when executing the computer instructions, is configured to:
   detect an inter-integrated circuit (i2c) communication bus through a baseboard management controller (BMC) in a GPU Box server being powered on, to determine whether there is a next-stage GPU Box server corresponding to the GPU Box server;
   read an IP address and location information of the next-stage GPU Box server from the i2c communication bus through the BMC in the GPU Box server, in response to a positive determination;
   store the IP address and the location information of the next-stage GPU Box server into a data structure of the GPU Box server, such that a master control server reads the data structure of the GPU Box server and establishes network communication between the master control server and the next-stage GPU Box server based on the IP address and the location information stored in the data structure of the GPU Box server;
   read an IP address of the GPU Box server from the i2c communication bus through the master control server, and establish network communication between the master control server and the GPU Box server based on the IP address of the GPU Box server;

read a data structure of the next-stage GPU Box server from the i2c communication bus through the BMC in the GPU Box server, wherein the data structure of the next-stage GPU Box server is stored with an IP address and location information of a later-stage GPU Box server corresponding to the next-stage GPU Box server; and add the IP address and the location information of the later-stage GPU Box server corresponding to the next-stage GPU Box server stored in the data structure of the next-stage GPU Box server to the data structure of the GPU Box server, such that the master control server establishes network communication between the master control server and each GPU Box server based on each IP address and corresponding location information stored in the data structure of the GPU Box server.

5. A communication system for cascaded graphics processing unit (GPU) Box servers, comprising the communication apparatus for cascaded GPU Box servers according to claim 4.

\* \* \* \* \*